US008775426B2

(12) United States Patent
Mukerjee et al.

(10) Patent No.: US 8,775,426 B2
(45) Date of Patent: Jul. 8, 2014

(54) INTERFACE TO NAVIGATE AND SEARCH A CONCEPT HIERARCHY

(75) Inventors: Kunal Mukerjee, Redmond, WA (US); Naveen Garg, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 153 days.

(21) Appl. No.: 12/881,192

(22) Filed: Sep. 14, 2010

(65) Prior Publication Data

US 2012/0066210 A1 Mar. 15, 2012

(51) Int. Cl.
*G06F 7/00* (2006.01)
*G06F 17/30* (2006.01)

(52) U.S. Cl.
USPC ............................ 707/737; 707/758; 707/956

(58) Field of Classification Search
USPC ......... 707/705, 722, 723, 731, 736, 737, 758, 707/956, 999.1
See application file for complete search history.

(56) References Cited

U.S. PATENT DOCUMENTS

| 7,085,771 | B2 | 8/2006 | Chung et al. |
| 7,555,478 | B2 | 6/2009 | Bayley et al. |
| 7,890,533 | B2 * | 2/2011 | Pollara ........................... 707/790 |
| 2003/0115191 | A1 * | 6/2003 | Copperman et al. .............. 707/3 |
| 2003/0217335 | A1 * | 11/2003 | Chung et al. .................. 715/514 |
| 2004/0111438 | A1 * | 6/2004 | Chitrapura et al. ........... 707/200 |
| 2004/0236737 | A1 * | 11/2004 | Weissman et al. ................. 707/4 |
| 2005/0160107 | A1 * | 7/2005 | Liang ............................. 707/100 |
| 2006/0053151 | A1 * | 3/2006 | Gardner et al. ............... 707/102 |
| 2006/0167930 | A1 | 7/2006 | Witwer et al. |
| 2007/0018983 | A1 * | 1/2007 | Vimme ......................... 345/440 |
| 2007/0198506 | A1 * | 8/2007 | Attaran Rezaei et al. ........ 707/5 |
| 2007/0226204 | A1 * | 9/2007 | Feldman ........................... 707/5 |
| 2008/0065603 | A1 | 3/2008 | Carlson et al. |
| 2010/0153368 | A1 | 6/2010 | Peoples et al. |
| 2010/0287478 | A1 * | 11/2010 | Avasarala et al. ............. 715/737 |
| 2011/0314034 | A1 * | 12/2011 | Adhikari et al. .............. 707/754 |

OTHER PUBLICATIONS

Sridevi, et al., "A Concept Relation Sub Graph in Semantic Web using Genetic Algorithm", Retrieved at <<www.ijpeai.com/Volume3/2009-0301-2014_final.pdf>>, In the proceedings of International Journal of Power, Energy and Artificial Intelligence, Dec. 2009, No. 1, vol. 3, p. 141-146.

Carriere, et al., "Concept-Based Navigation of the World-Wide Web", Retrieved at "http://blogs.msdn.com/b/jeromyc/archive/2004/11/02/251384.aspx", Nov. 2, 2004, pp. 2.

* cited by examiner

*Primary Examiner* — Hares Jami
(74) *Attorney, Agent, or Firm* — Nicholas Chen; Kate Drakos; Micky Minhas (57) ABSTRACT

A method includes receiving a concept hierarchy at a computing device. The concept hierarchy identifies concepts associated with a document corpus. An interface based on the concept hierarchy is generated. The interface is operable to navigate, search, and modify the concept hierarchy. The method includes transmitting the interface for display to a display device.

19 Claims, 9 Drawing Sheets

INTERFACE TO NAVIGATE AND SEARCH A CONCEPT HIERARCHY

BACKGROUND

A document-centric information model is often used in business enterprises. In the document-centric information model, information is stored in documents. Millions of documents, each typically many pages in length, may be stored in a document repository that is accessible by employees of the business enterprise. The search experience for use in the document-centric information model involves a user that provides a search query, browses documents returned by a search engine, and refines the search query in the hopes of receiving more pertinent search results from the search engine. Due to the length and volume of available documents, searching for pertinent information and navigating to a particular point of interest within the document repository may be difficult and time-consuming.

SUMMARY

Systems, methods, and computer-readable media including an interface to navigate and search a concept hierarchy are disclosed. Despite the popularity of the document-centric information model, users may intuitively process information in terms of concepts and the relationship between concepts. Thus, an interface that enables conceptual navigation and search of a document corpus may provide a more intuitive, enjoyable, and efficient experience than document-centric user interfaces. Given a concept hierarchy that includes concepts mined from a document corpus, a user interface may be generated for the concept hierarchy. The interface may enable navigation, search, and modification of the concept hierarchy, including the capability to navigate and modify the concept hierarchy before searching the concept hierarchy. When a search is conducted, the interface may provide document search results as well as conceptual search results (e.g., a listing of concepts that are semantically related to a search query). At any point, a concept displayed at the interface may be selected for a user to view underlying documents or portions of documents in the document corpus that are semantically related to the selected concept. In particular scenarios, the concept hierarchy may be a self-organizing concept hierarchy. For example, the concept hierarchy may determine whether to reorganize itself each time a new document is added to the document corpus.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

A computing device may receive a concept hierarchy that is generated by concept mining documents of a document corpus. The computing device may generate an interface representing the concept hierarchy and may transmit the interface for display to a display device. The interface may enable users to navigate, search, and modify the concept hierarchy. The interface may also enable selection of concepts to view underlying documents of the document corpus that are related to the selected concepts. The concept hierarchy can be a self-organizing concept hierarchy that automatically updates itself in response to the addition of a new document into the document corpus or the modification of an existing document of the document corpus.

In a particular embodiment, a system includes a processor, a concept hierarchy module executable by the processor, and an interface module executable by the processor. The concept hierarchy module is executable to determine a concept hierarchy corresponding to a document corpus and to update the concept hierarchy response to detecting that a new document is added to the document corpus or that an existing document in the document corpus is modified. The interface module is executable to generate an interface based on the concept hierarchy and to transmit the interface for display to a display device. The interface module is also executable to receive user input at the interface. The interface module is further executable to update the interface to reflect result of performing a navigation, search, or modification operation on the concept hierarchy based on the user input.

In another particular embodiment, a method includes receiving a concept hierarchy at a computing device, where the concept hierarchy identifies concepts associated with a document corpus. The method also includes generating an interface based on the concept hierarchy, where the interface is operable to navigate and search the concept hierarchy. The method further includes receiving a search query via the interface. The method includes identifying document search results by searching the document corpus based on the search query and identifying conceptual search results by searching the concept hierarchy for one or more concepts that are semantically related to the search query. The method also includes displaying the document search results and the conceptual search results at the interface. The document search results are selectable via the interface to view one or more documents of the document corpus that are associated with the document search results. The conceptual search results are selectable via the interface to view one or more documents of the document corpus that are associated with a selected concept identified by the conceptual search results.

In another particular embodiment, a computer-readable storage medium includes instructions that, when executed by a computer, cause the computer to receive a concept hierarchy at a computing device. The concept hierarchy identifies concepts associated with a document corpus. The instructions also cause the computer to generate an interface based on the concept hierarchy. The interface is operable to navigate, search, and modify the concept hierarchy. The instructions further cause the computer to transmit the interface for display to a display device. The instructions may be implemented as a computer software application that is stored in the computer-readable storage medium.

Figure 1:
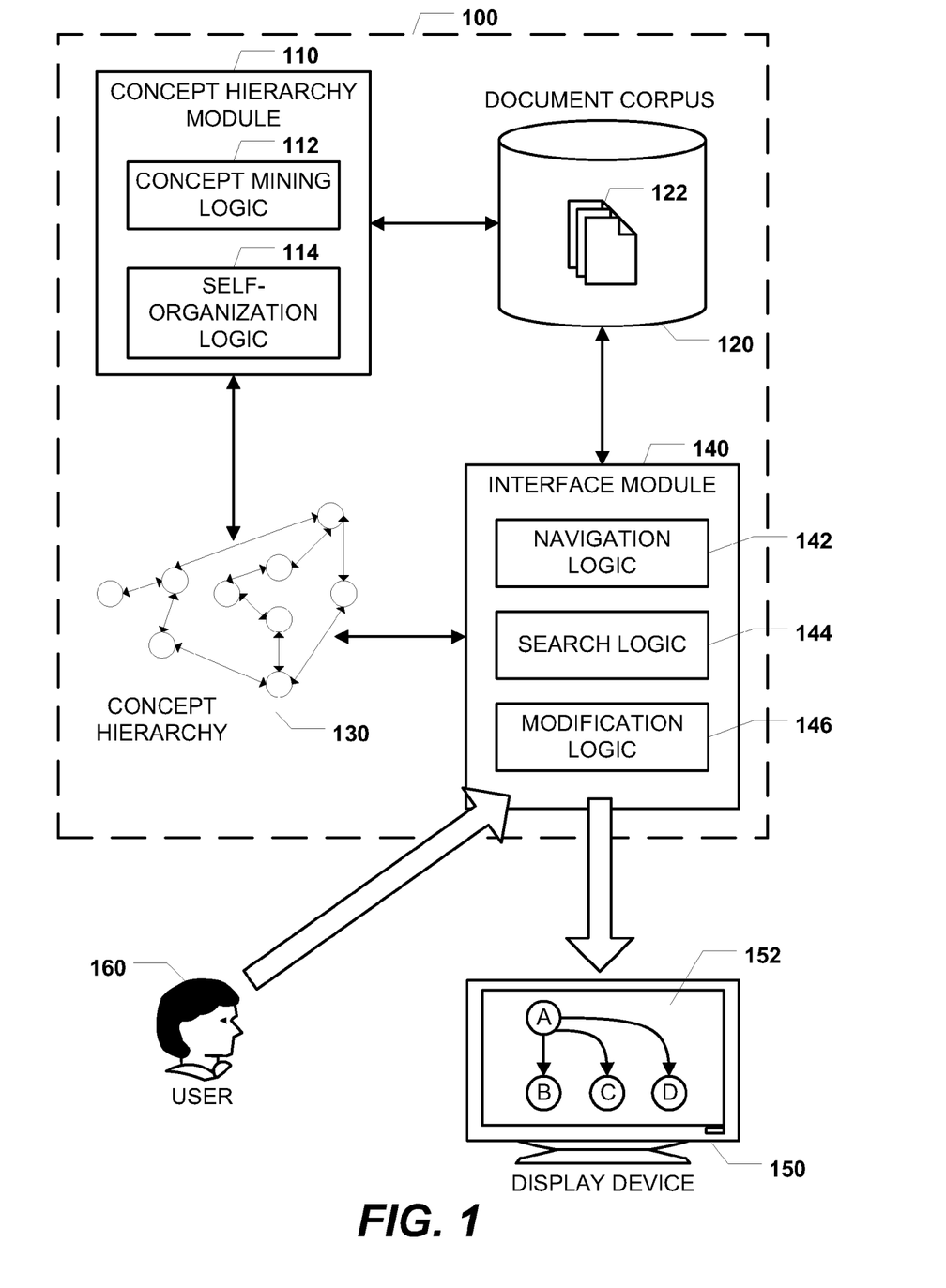
FIG. 1 is a diagram to illustrate a particular embodiment of a system to generate an interface to navigate and search a concept hierarchy derived from a document corpus.

FIG. 1 is a diagram to illustrate a particular embodiment of a system 100 to generate an interface 152 to navigate and search a concept hierarchy 130. The system 100 includes a concept hierarchy module 110, a document corpus 120, and an interface module 140.

The concept hierarchy module 110 may include concept mining logic 112 and self-organization logic 114. The concept mining logic 112 may be configured to determine a concept hierarchy (e.g., the concept hierarchy 130) corresponding to the document corpus 120. For example, the concept mining logic 112 may process documents (e.g., illustrative documents 122) of the document corpus 120 to generate the concept hierarchy 130. It should be noted that although the documents 122 of the document corpus 120 are illustrated in FIG. 1 as part of the system 100, one or more documents of the document corpus 120 may also be located at other computing devices or systems that are accessible via a network. Thus, the document corpus 120 may include local documents, remote documents, or any combination thereof. Each concept of the concept hierarchy 130 may include one or more terms that are included in at least one of the documents 122 in the document corpus 120. The concept hierarchy 130 may be stored at a random access memory (RAM) or disk-based memory at the system 100.

In a particular embodiment, the concept hierarchy 130 may be a self-organizing concept hierarchy. For example, the self-organization logic 114 may be used to implement self-organization features with respect to the concept hierarchy 130. In a particular embodiment, the self-organization logic 114 is capable of detecting that a document has been added to the document corpus 120, determining whether an existing document of the document corpus 120 has been modified, and determining whether or not the concept hierarchy 130 is updated in response to the addition or modification. The self-organization logic 114 may also automatically update the concept hierarchy 130 as needed.

For example, when a new document is added to the document corpus 120, automatically updating the concept hierarchy 130 may include adding concepts to the concept hierarchy 130, removing concepts from the concept hierarchy 130, reorganizing the concept hierarchy 130, or any combination thereof. Concepts that are added to the concept hierarchy 130 may include new concepts from the new document or concepts that have, in light of the new document, become prevalent enough in the document corpus to warrant inclusion into the concept hierarchy 130. Concepts that are removed from the concept hierarchy 130 may include concepts that have, in light of the new document, become rare enough in the document corpus to warrant removal from the concept hierarchy 130. In a particular embodiment, the concept hierarchy 130 is represented as a graph that includes a plurality of nodes connected by a plurality of links, where each node corresponds to a concept and each link between a pair of nodes represents a weighted semantic relationship between concepts corresponding to the pair of nodes.

Reorganizing the concept hierarchy 130 may include establishing new links, removing existing links, updating weights for existing links, or any combination thereof. Concept hierarchies are further described and illustrated with reference to FIGS. 3-4. It will be appreciated that although the concepts corresponding to nodes connected by a link may be related semantically, the concepts may not be related lexically (e.g., may not be the same or synonymous terms). Thus, the concept hierarchy 130 may enable discovery of semantic relationships that may not be found via lexical searches in a document-centric information model.

The interface module 140 may receive the concept hierarchy 130 and may generate the interface 152 based on the concept hierarchy 130. The interface module 140 may also transmit the interface 152 for display to a display device 150. In a particular embodiment, the interface 152 is integrated into a file manager application (e.g., to conceptually navigate and search data at a single computing device), a collaboration portal (e.g., to conceptually navigate and search data shared between multiple computing devices), or a database application (e.g., to conceptually navigate and search a database) that is executed at the system 100. The interface module 140 may include navigation logic 142, search logic 144, and modification logic 146. In a particular embodiment, the interface module 140 is configured to receive input (e.g., user input from an illustrative user 160) at the interface 152.

The navigation logic 142 may perform a navigation operation on the concept hierarchy 130 and may update the interface 152 to reflect the results of the navigation operation. Depending on the user input received from the user 160, the navigation operation may include zooming in on a portion of the concept hierarchy 130, zooming out from a portion of the concept hierarchy 130, panning (e.g., left, right, up, or down) on the concept hierarchy 130, or any combination thereof. The navigation operation may also include traversing a link between two nodes of the concept hierarchy 130, "expanding" a particular node of the concept hierarchy 130 to display previously hidden nodes linked to the particular node, "collapsing" a particular node of the concept hierarchy to hide previously displayed nodes linked to the particular node, or any combination thereof.

The search logic 144 may perform a search operation on the concept hierarchy 130 and may update the interface 152 to reflect the results of the search operation. For example, the user 160 may input a search query and the search logic 144 may perform a search of the concept hierarchy 130 to identify one or more concepts in the concept hierarchy 130 that are semantically relevant to the search query. The search logic 144 may update the interface 152 to display the identified concepts. In a particular embodiment, the search logic 144 also searches the documents 122 of the document corpus 120 based on the search query. For example, the search logic 144 may identify particular documents or portions of documents that are lexically related to the search query. The search logic 144 may update the interface 152 to display document search results that are lexically related to the search query in addition to the conceptual search results that are semantically related to the search query.

The modification logic 146 may modify the concept hierarchy 130 based on input received at the interface 152. For example, modifying the concept hierarchy 130 may include reorganizing the concept hierarchy 130, renaming particular concepts of the concept hierarchy 130, or any combination thereof.

In operation, the concept hierarchy module 110 may mine the document corpus 120 to generate the concept hierarchy 130. The concept hierarchy 130 may include concepts that are determined to be relatively prevalent in the documents 122 of the document corpus 120. Each concept of the concept hierarchy 130 may include one or more terms that are included in at least one of the documents 122 in the document corpus 120. In a particular embodiment, determining the relative prevalence of concepts includes applying an entropy-based concept mining algorithm to the document corpus 120. When new documents are added to the document corpus 120, the concept hierarchy module 110 may automatically update the concept hierarchy 130. The interface module 140 may generate the interface 152 based on the concept hierarchy 130 and may transmit the interface 152 for display to the display device 150. The interface module 140 may receive input (e.g., from the user 160) at the interface 152 and may perform one or more operations on the concept hierarchy 130 based on the received input. For example, the interface module 140 may navigate, search, or modify the concept hierarchy 130 based on the received input. The interface module 140 may also update the interface 152 to reflect the results of performing the navigation, search, or modification.

In a particular example of operation, the user 160 may navigate and modify the concept hierarchy 130 via the interface 152 prior to searching the concept hierarchy 130 via the interface 152. For example, the user 160 may initially view a list of concepts related to the concept "A" and documents of the document corpus 120 associated with the concept "A." The user 160 may then navigate from the concept "A" to the concept "B" (e.g., by using an input device at the system 100, such as a mouse, to select the concept "B" at the interface 152). The user 160 may subsequently view a list of concepts related to the concept "B" and documents of the document corpus 120 associated with the concept "B." The user 160 may also modify the concept hierarchy 130 via the interface 152 (e.g., by renaming "B" to "E"). The interface 152 may be updated to reflect the modification (e.g., by displaying "E" instead of "B"). The modified concept hierarchy may be further navigated, further modified, or searched by the user 160 via the interface 152.

It will be appreciated that the system 100 of FIG. 1 may enable concept-centric (as opposed to document-centric) navigation and search of information in a document corpus. It will also be appreciated that the system 100 of FIG. 1 may provide both document-centric search results as well as concept-centric search results, thereby increasing a likelihood of returning pertinent search results for a search query. The system 100 of FIG. 1 may thus enable intuitive and efficient navigation and search of a document corpus.

Figure 2:
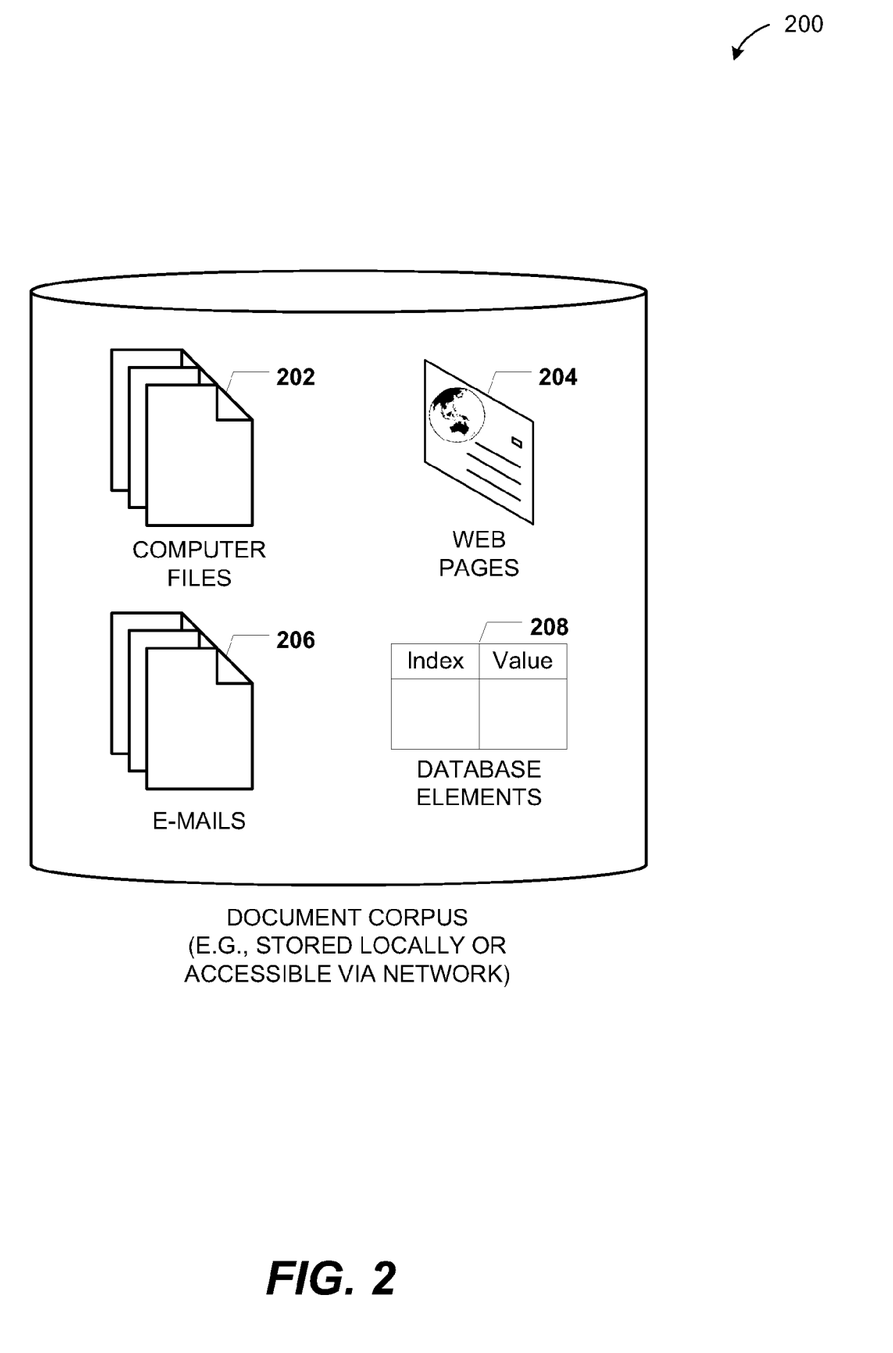
FIG. 2 is a diagram to illustrate a particular embodiment of the document corpus of FIG. 1.

FIG. 2 is a diagram to illustrate a particular embodiment of a document corpus 200. In an illustrative embodiment, the document corpus 200 is the document corpus 120 of FIG. 1.

The document corpus may include computer files 202. For example, the computer files 202 may include documents, spreadsheets, presentations, and other files including text that may be processed by concept mining logic (e.g., the concept mining logic 112 of FIG. 1). The document corpus 200 may also include web pages 204. For example, the web pages 204 may be associated with one or more websites managed by an enterprise that owns the document corpus 200.

The document corpus may further include e-mails 206 and other communication. For example, the e-mails may include an archive of e-mail messages sent and received by employees at a business enterprise. In a particular embodiment, the document corpus includes database elements 208, such as database tables and scripts.

It should be noted that documents may be added and removed from the document corpus automatically or manually. For example, monitors at a business enterprise may automatically add newly created documents to the document corpus 200 and may automatically remove deleted documents from the document corpus 200. Alternately, users at the business enterprise may manually add and remove documents from the document corpus 200 to control the quantity and content of documents made available to concept mining logic (e.g., the concept mining logic 110 of FIG. 1). The modification of documents at the document corpus 200 may similarly be monitored.

Figure 3:
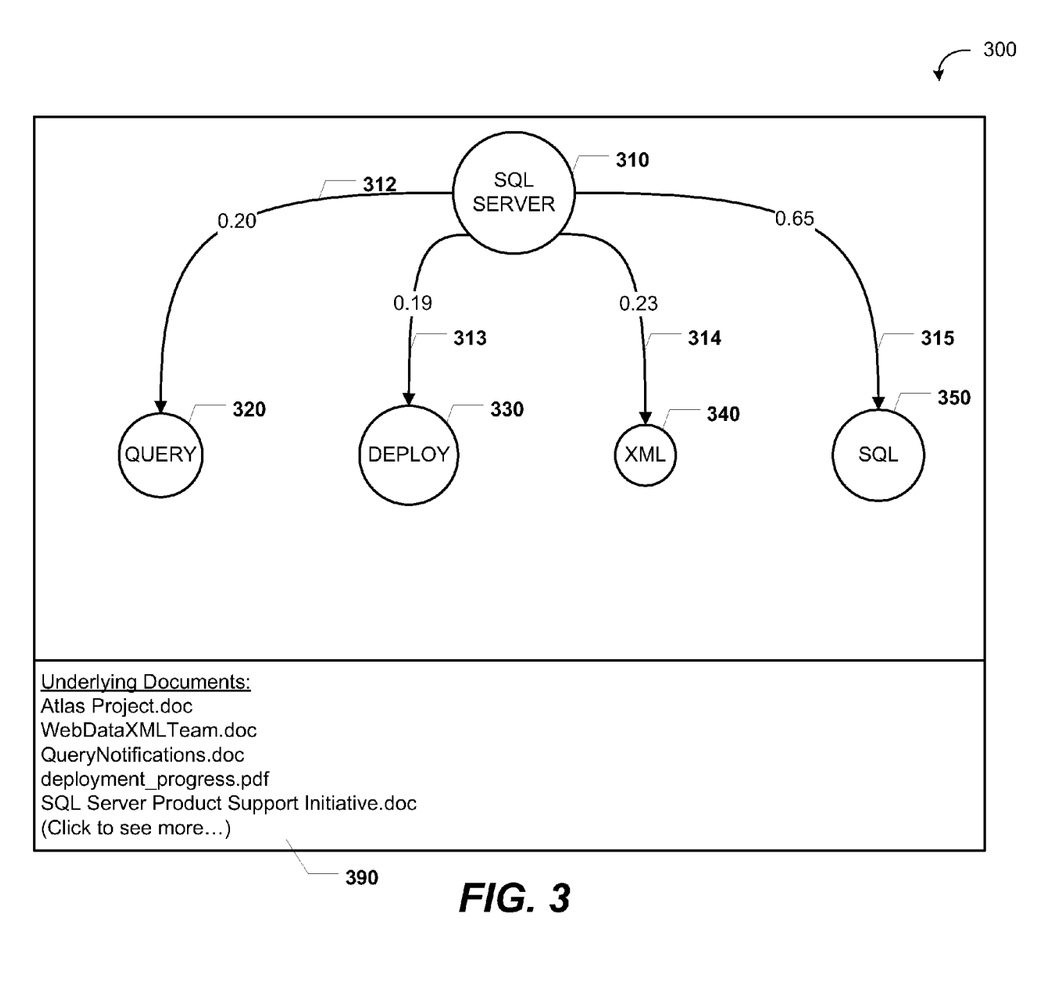
FIG. 3 is a diagram to illustrate a particular embodiment of the interface of FIG. 1.

FIG. 3 illustrates a particular embodiment of an interface 300 that represents a concept hierarchy. In an illustrative embodiment, the interface 300 is the interface 152 of FIG. 1.

In the particular embodiment illustrated in FIG. 3, the concept hierarchy is represented as a graph including a plurality of nodes (e.g., illustrative nodes 310, 320, 330, 340, and 350) connected by a plurality of links (e.g., illustrative links 312, 313, 314, and 315). Each node may represent a particular concept and each link between two nodes may represent a semantic relationship between the two concepts corresponding to the two nodes. In a particular embodiment, the interface 300 may "focus" on one or more nodes. For example, in the particular embodiment illustrated in FIG. 3, the node 310 (and corresponding concept "SQL SERVER") may be the "focus" of the interface 300, since outgoing links may be displayed for the node 310 but not for the nodes 320, 330, 340, and 350. In a particular embodiment, the interface 300 identifies underlying documents 390 of a document corpus that were mined to generate the interface 300.

In a particular embodiment, the links of the concept hierarchy also indicate a relative weight of the semantic relationship between the two concepts. For example the concepts "SQL SERVER" (at node 310) and "QUERY" (at node 320) may have a semantic relationship weight of 0.20, as indicated by the link 312. The concepts "SQL SERVER" (at node 310) and "DEPLOY" (at node 330) may have a semantic relationship weight of 0.19, as indicated by the link 313. The concepts "SQL SERVER" (at node 310) and "XML" (at node 340) may have a semantic relationship weight of 0.23, as indicated by the link 314. The concepts "SQL SERVER" (at node 310) and "SQL" (at node 350) may have a semantic relationship weight of 0.65, as indicated by the link 315. In a particular embodiment, the greater the weight the more semantically related the concepts. It will be appreciated that by displaying weights that indicate degrees of relation between concepts, the interface 300 may provide an informative representation of a document corpus that is navigable and searchable. For example, the interface 300 may provide a more informative search experience than search engines that are "flat" in organization and display search results without displaying metrics or a notion of distance.

In a particular embodiment, the interface 300 may display weights that are adapted based on user feedback, subsequent processing of documents in the document corpus, or any combination thereof. For example, a user may provide feedback indicating that a particular link at the interface 300 is over-weighted or under-weighted. The underlying system (e.g., the system 100 of FIG. 1) may adapt the weight of the particular link in real-time or near real-time in response to such feedback, and the interface 300 may display the adapted weight. As another example, the system may dynamically update weights as documents are added, removed, and updated at the document corpus. It will be appreciated that the interface 300 may thus enhance the information search and browsing experience by providing a collaborative filtering capability and an adaptive metric space, thereby transforming the search and browsing experience from a "passive" research activity to an "active" decision making tool.

The interface 300 may also indicate a relative prevalence of displayed concepts. In a particular embodiment, a size of each node may indicate a relative prevalence of a concept corresponding to the node, where more prevalent concepts are displayed as larger nodes than nodes that represent less prevalent concepts. For example, the concept "SQL SERVER" (displayed at the node 310) may be more prevalent than the concepts "QUERY," "DEPLOY," and "SQL" (displayed at the nodes 330, 340, and 350). The concept "XML" (displayed at the node 340), may be less prevalent than the concepts "QUERY," "DEPLOY," and "SQL" (displayed at the nodes 330, 340, and 350). Alternately, or in addition, the size of each node may indicate a number of hierarchy levels under the concept corresponding to the node. For example, the concept "SQL server" (displayed at the node 310) may have a greater number of hierarchy levels under it than the concept "XML" (displayed at the node 340).

Figure 4:
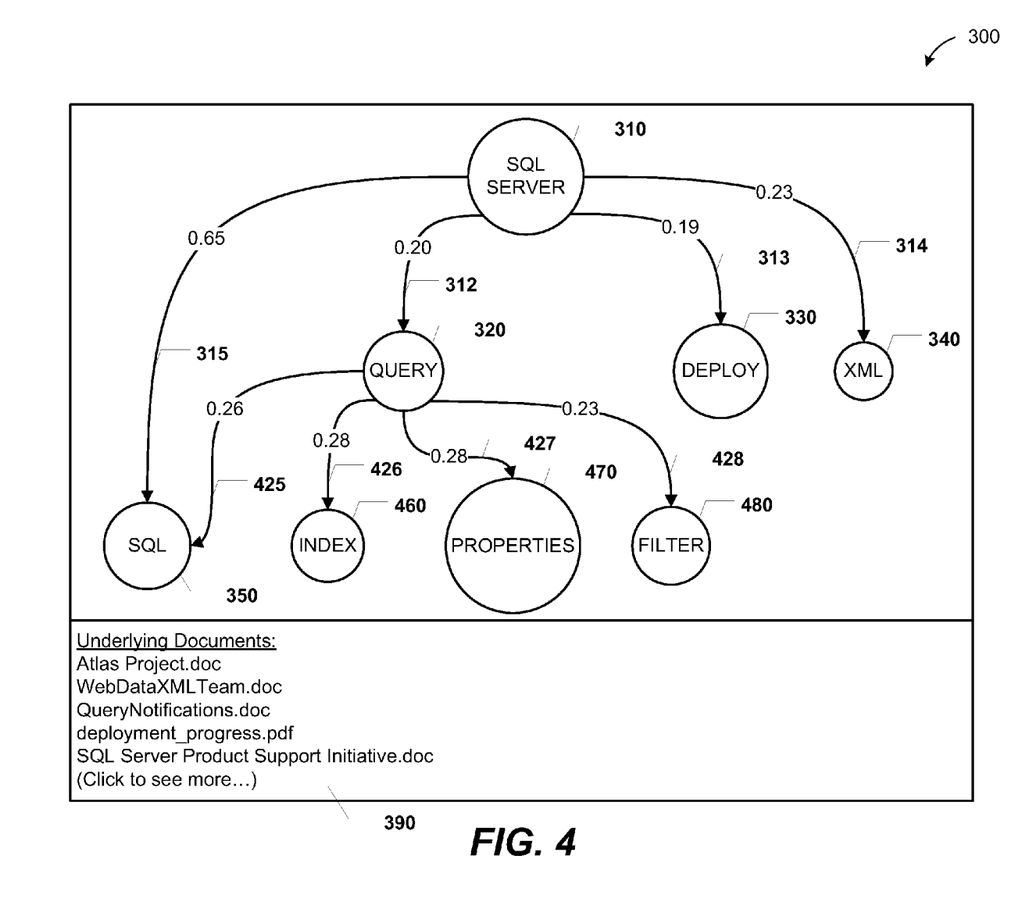
FIG. 4 is a diagram to illustrate another particular embodiment of the interface of FIG. 1.

FIG. 4 is a diagram to illustrate a particular embodiment of updating the interface 300 of FIG. 3 based on a navigation operation. For example, a user may have navigated from the node 310 to the node 320 (e.g., by selecting the concept "QUERY" at the node 320), thereby making the node 320 the new focus of the interface 300.

As illustrated in FIG. 4, the node 320 may have outgoing links 425, 426, 427, and 428, indicating semantic relationship weights between the concept "QUERY" and the concepts "SQL," "INDEX," "PROPERTIES," and "FILTER" (represented by nodes 350, 460, 470, and 480). It will be appreciated that updating the interface 300 based on the navigation operation may also display more or fewer nodes and links than before the navigation operation. Moreover, nodes at the interface may include more or fewer links than before the navigation operation. For example, because the concept "SQL" is semantically related to both the concept "SQL SERVER" as well as the concept "QUERY," the interface 300 keeps the original link 315 between the node 350 and the node 310 and also displays the link 425 between the node 320 and the node 350.

Figure 5:
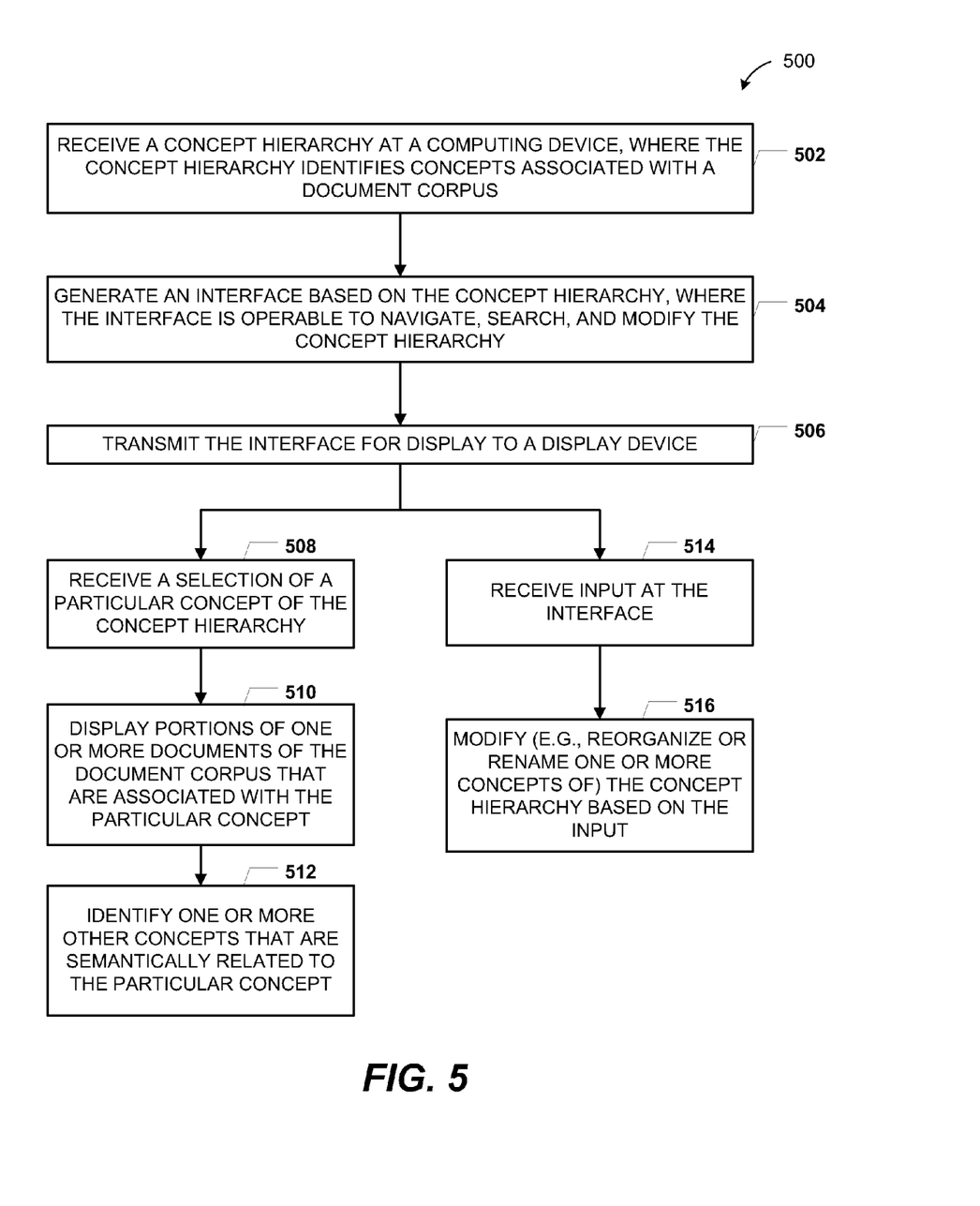
FIG. 5 is a flow diagram to illustrate a particular embodiment of a method of generating an interface to navigate and search a concept hierarchy.

FIG. 5 is a flow diagram to illustrate a particular embodiment of a method 500 of generating an interface to navigate and search a concept hierarchy. In an illustrative embodiment, the method 500 may be performed by the system 100 of FIG. 1.

The method 500 includes receiving a concept hierarchy at a computing device, at 502. The concept hierarchy identifies concepts associated with a document corpus. For example, in FIG. 1, the interface module 140 may receive the concept hierarchy 130, where the concept hierarchy 130 identifies concepts associated with the documents 122 of the document corpus 120.

The method 500 also includes generating an interface based on the concept hierarchy, at 504. The interface is operable to navigate, search, and modify the concept hierarchy. For example, in FIG. 1, the interface module 140 may generate the interface 152. The method 500 further includes transmitting the interface for display to a display device, at 506. For example, in FIG. 1, the interface 152 may be transmitted for display to the display device 150.

The method 500 may include receiving a selection of a particular concept of the concept hierarchy, at 508, displaying portions of one or more documents of the document corpus that are associated with the particular concept, at 510, and identifying one or more other concepts that are semantically related to the particular concept, at 512. For example, in FIG. 1, the user 160 may select a concept of the concept hierarchy 130 via the interface 152, and the interface module 140 may display associated documents and semantically related concepts for the selected concept. In an illustrative embodiment, documents and semantically related concepts are displayed by an interface as described and illustrated with reference to FIGS. 7-8.

Alternately, the method 500 may include receiving input at the interface, at 514, and modifying the concept hierarchy based on the input, at 516. Modifying the concept hierarchy may include reorganizing the concept hierarchy, renaming one or more concepts of the concept hierarchy, or any combination thereof. For example, in FIG. 1, the user 160 may provide input that causes the interface module 140 to reorganize and/or rename portions of the concept hierarchy 140.

Figure 6:
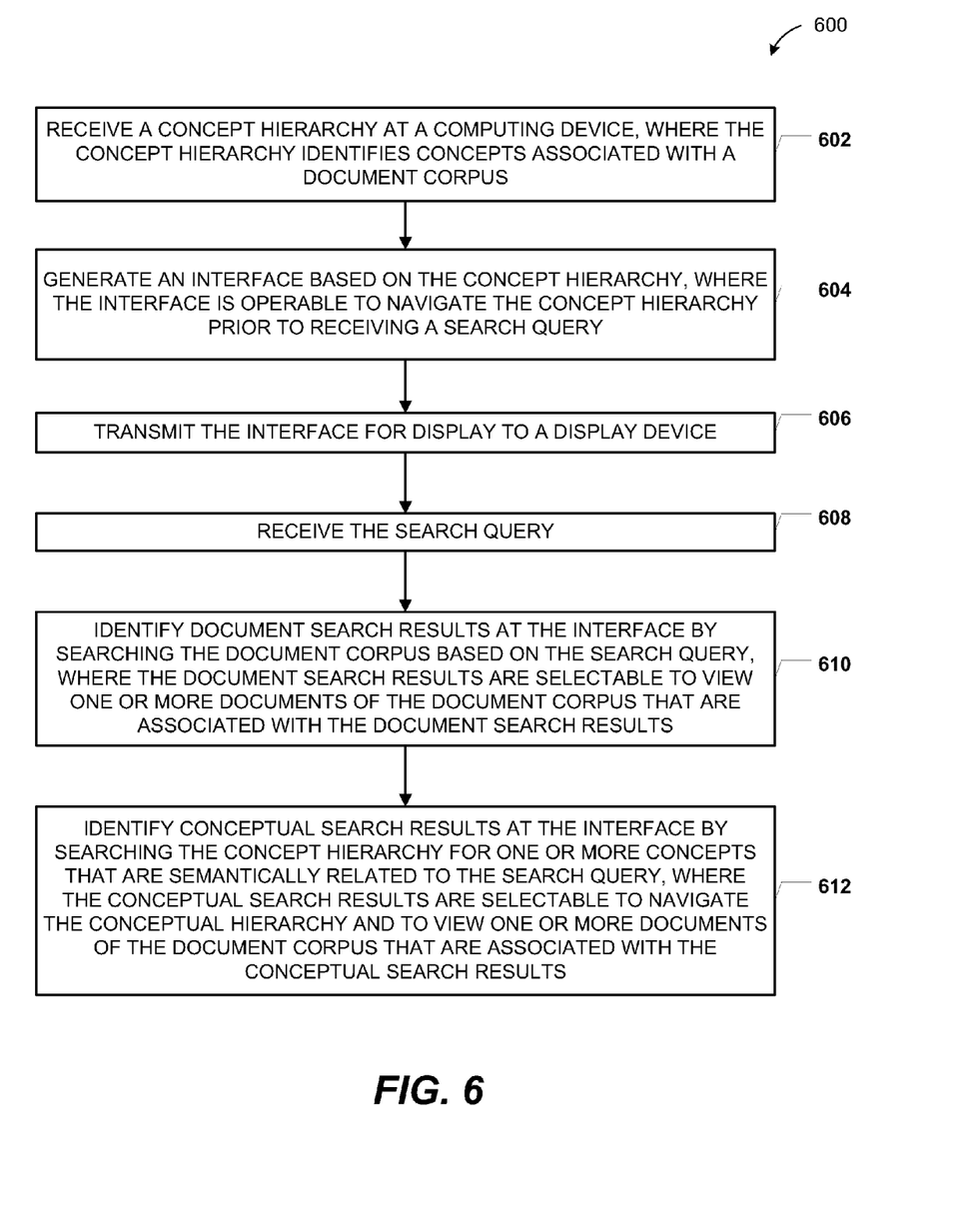
FIG. 6 is a flow diagram to illustrate another particular embodiment of a method of generating an interface to navigate and search a concept hierarchy.

FIG. 6 is a flow diagram to illustrate another particular embodiment of a method 600 of generating an interface to navigate and search a concept hierarchy. In an illustrative embodiment, the method 600 may be performed by the system 100 of FIG. 1.

The method 600 includes receiving a concept hierarchy at a computing device, at 602. The concept hierarchy identifies concepts associated with a document corpus. For example, in FIG. 1, the interface module 140 may receive the concept hierarchy 130, where the concept hierarchy 130 identifies concepts associated with the documents 122 of the document corpus 120.

The method 600 also includes generating an interface based on the concept hierarchy, at 604. The interface is operable to navigate the concept hierarchy prior to receiving a search query. For example, in FIG. 1, the interface module 140 may generate the interface 152. The interface 152 may be used to navigate and modify the concept hierarchy 130 prior to searching the concept hierarchy 130. The method 600 further includes transmitting the interface for display to a display device, at 606. For example, in FIG. 1, the interface 152 may be transmitted for display to the display device 150.

The method 600 includes receiving the search query, at 608. For example, in FIG. 1, the user 160 may input the search query at the interface 152. The method also includes identifying document search results at the interface by searching the document corpus based on the search query, at 610. The document search results are selectable to view one or more documents of the document corpus that are associated with the document search results. For example, in FIG. 1, the search logic 144 may search the documents 122 based on the search query and may update the interface 152 to identify document search results.

The method 600 further includes identifying conceptual search results at the interface by searching the concept hierarchy for one or more concepts that are semantically related to the search query, at 612. The conceptual search results are selectable to navigate the conceptual hierarchy and to view one or more documents of the document corpus that are associated with the conceptual search results. For example, in FIG. 1, the search logic 144 may search the concept hierarchy 130 for concepts that are semantically related to the search query and may update the interface 152 to identify conceptual search results.

Figure 7:
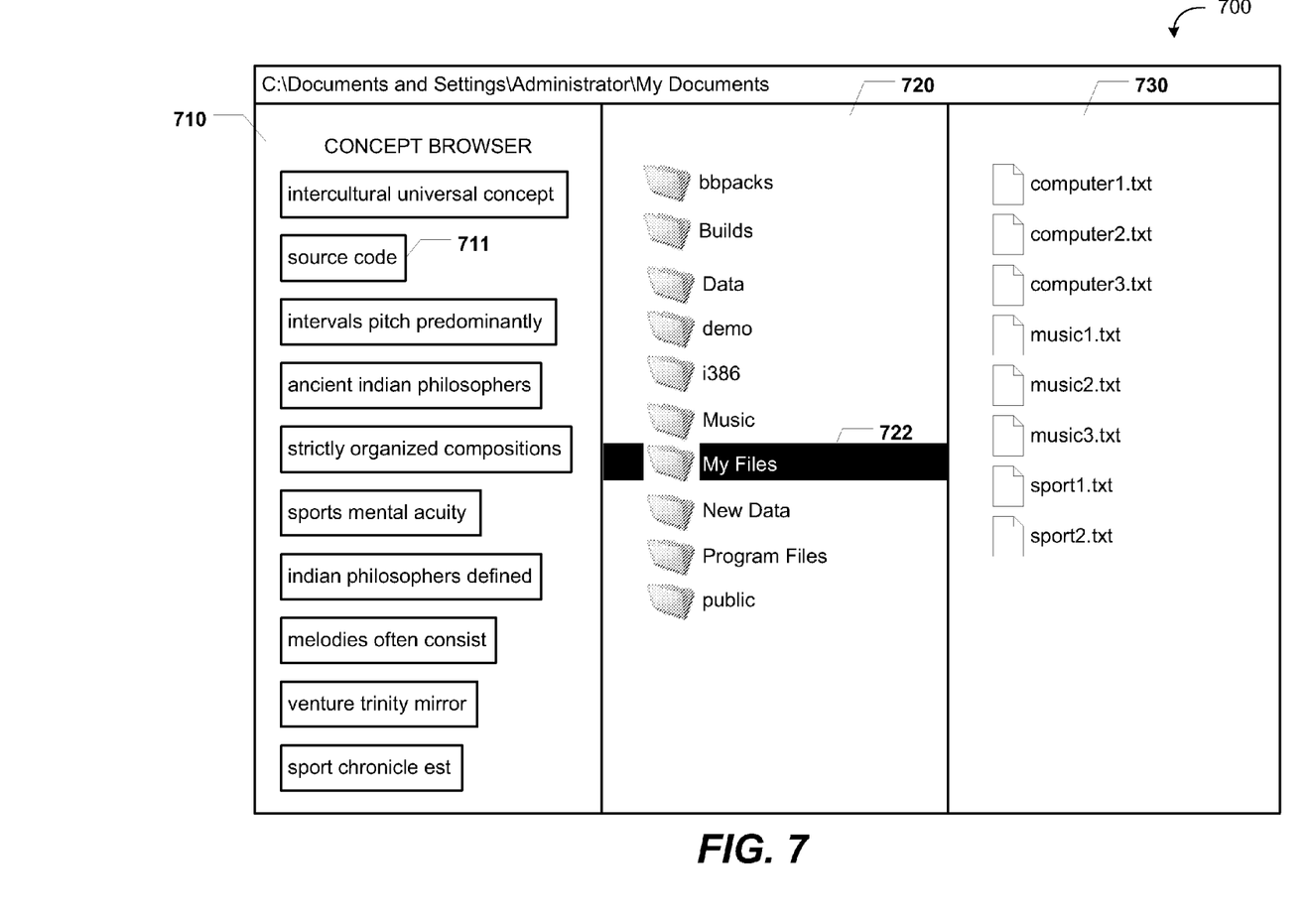
FIG. 7 is a screenshot of a particular embodiment of a file manager application that includes an interface to navigate and search a concept hierarchy.

FIG. 7 is a screenshot of a particular embodiment of a file manager application that includes an interface 700 to navigate and search a concept hierarchy. In an illustrative embodiment, the file manager application interface 700 includes the interface 152 of FIG. 1.

In the particular embodiment illustrated in FIG. 7, the file manager application interface 700 includes three areas: a concept browser 710, a folder viewer 720, and a file viewer 730. The concept browser 710 may display one or more concepts of a concept hierarchy that has been generated based on the contents of the folders in the folder viewer 720. For example, as illustrated in FIG. 7, the concept browser 710 may include a concept "source code" 711, indicating the presence of source code files and/or the phrase "source code" within the folders of the folder viewer 720.

The folder viewer 720 may be operable to receive a selection of a folder and cause the file viewer 730 to display the files contained in the selected folder. For example, as illustrated in FIG. 7, the folder viewer 720 may receive a selection of a folder "My Files" 722 and cause the file viewer 730 to display the files contained in the folder "My Files" 722, including the files "computer1.txt," "computer2.txt," "computer3.txt," "music1.txt," "music2.txt," "music3.txt," "sport1.txt," and "sport2.txt."

Figure 8:
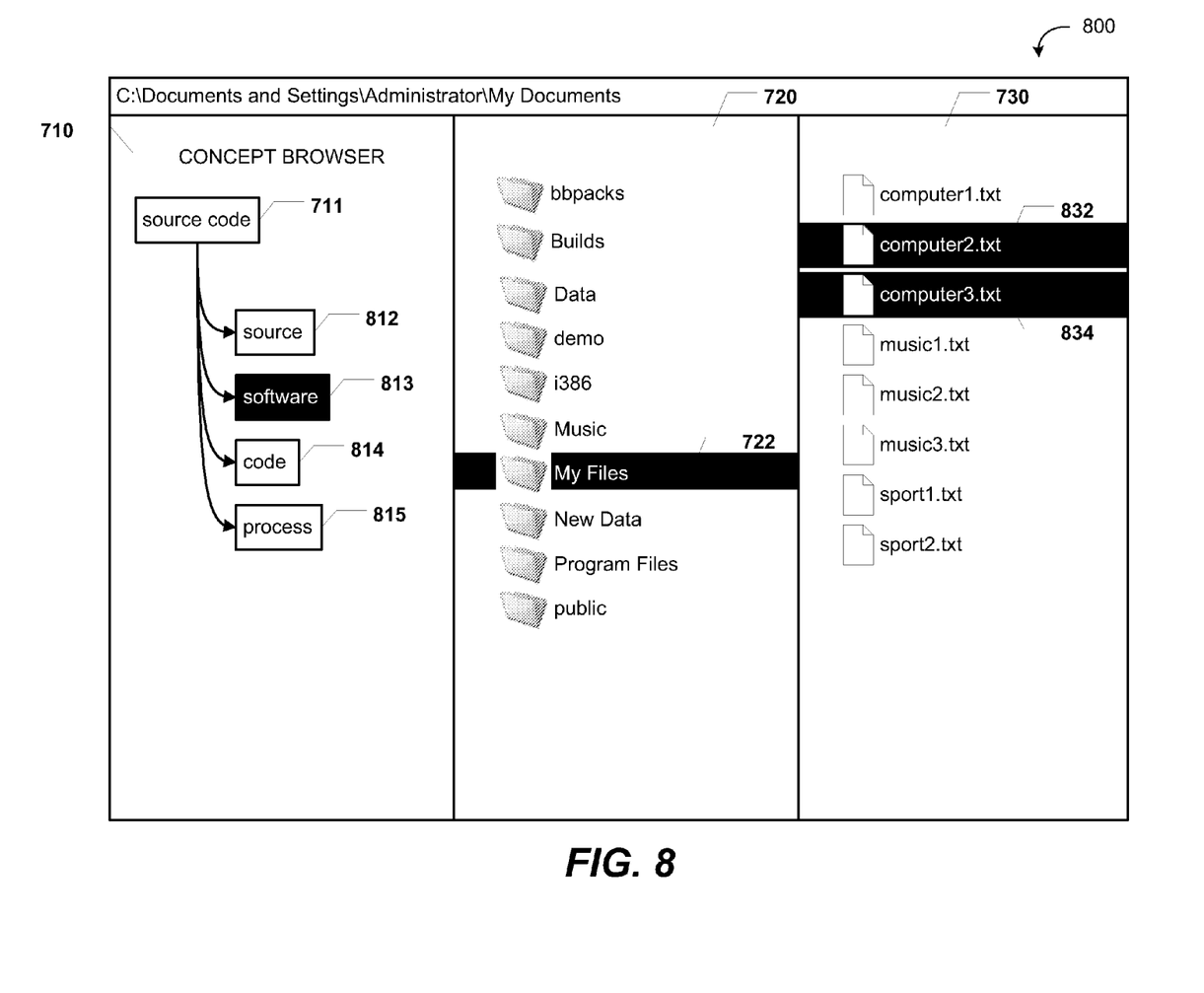
FIG. 8 is a screenshot of another particular embodiment of the file manager application of FIG. 7.

FIG. 8 is a screenshot of another particular embodiment of the file manager application interface 700 of FIG. 7. For example, the file manager application interface 700 may update one or more of the concept browser 710, the folder viewer 720, and the file viewer 730 in response to a navigation of the concept hierarchy underlying the concept browser 710.

In the particular embodiment illustrated in FIG. 8, a user of the file manager application interface 700 has expanded (e.g., in response to a user selection) the concept "source code" 711. Expanding the concept "source code" 711 may include displaying concepts of the concept hierarchy that are semantically related to the concept "source code" 711. For example, the newly displayed concepts may include the concepts "source" 812, "software" 813, "code" 814, and "process" 815.

In the particular embodiment illustrated in FIG. 8, a user of the file manager application interface 700 has also selected a concept "software" 813. In response to the selection of the concept "software" 813, the file manager application interface 700 may identify files associated with the concept "software" 813. For example, the file manager application 700 may identify that within the folder "My Files" 722, the files "computer2.txt" 832 and "computer3.txt" 834 may be associated with the concept "software 813." The identified files "computer2.txt" 832 and "computer3.txt" 834 may be selected at the file viewer 730 to view portions of the files "computer2.txt" 832 and "computer3.txt" 834 that are related to the concept "software" 813. It should be noted that other files located in folders besides the folder "My Files" 722 may also be associated with the concept "software" 813, but may not be shown because only the folder "My Files" 722 is selected in the folder viewer 720.

Figure 9:
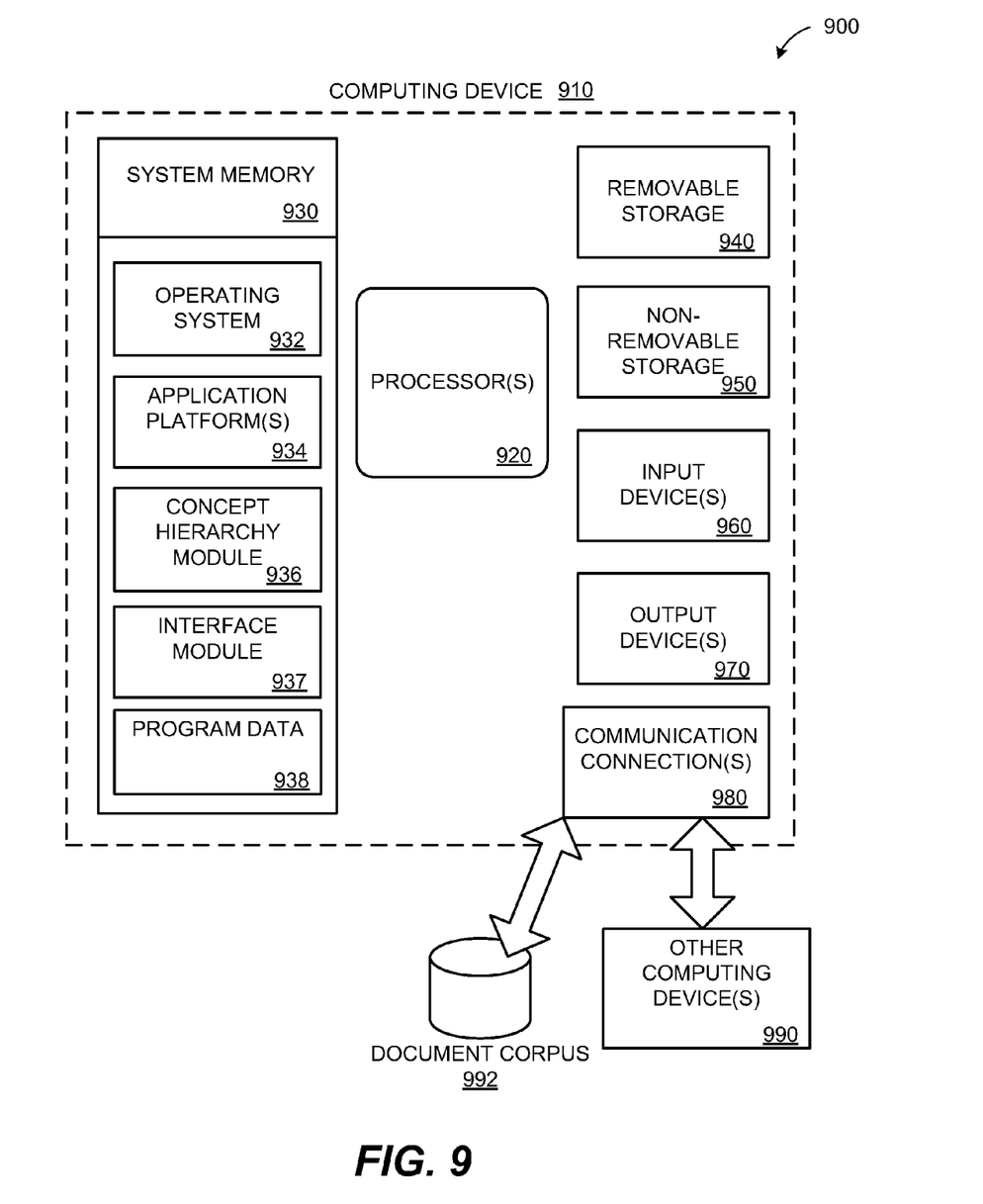
FIG. 9 is a block diagram of a computing environment including a computing device operable to support embodiments of computer-implemented methods, computer program products, and system components as illustrated in FIGS. 1-8.

FIG. 9 shows a block diagram of a computing environment 900 including a computing device 910 operable to support embodiments of computer-implemented methods, computer program products, and system components according to the present disclosure. For example, the computing device 910 or components thereof may include, implement, or be included by the concept hierarchy module 110 of FIG. 1, the document corpus 120 of FIG. 1, the interface module 140 of FIG. 1, the document corpus 200 of FIG. 2, or portions thereof.

The computing device 910 includes at least one processor 920 and a system memory 930. Depending on the configuration and type of computing device, the system memory 930 may be volatile (such as random access memory or "RAM"), non-volatile (such as read-only memory or "ROM," flash memory, and similar memory devices that maintain stored data even when power is not provided), some combination of the two, or some other memory. The system memory 930 typically includes an operating system 932, one or more application platforms 934, one or more applications, and program data 938. For example, the system memory 930 may include a concept hierarchy module 936 and an interface module 937. In an illustrative embodiment, the concept hierarchy module 936 is the concept hierarchy module 110 of FIG. 1 and the interface module 937 is the interface module 140 of FIG. 1.

The computing device 910 may also have additional features or functionality. For example, the computing device 910 may also include removable and/or non-removable additional data storage devices such as magnetic disks, optical disks, tape, and standard-sized or flash memory cards. Such additional storage is illustrated in FIG. 9 by removable storage 940 and non-removable storage 950. Computer storage media may include volatile and/or non-volatile storage and removable and/or non-removable media implemented in any technology for storage of information such as computer-readable instructions, data structures, program components or other data. The system memory 930, the removable storage 940, and the non-removable storage 950 are all examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, or any other medium that can be used to store information and that can be accessed by the computing device 910. Any such computer storage media may be part of the computing device 910.

The computing device 910 may also have input device(s) 960, such as a keyboard, mouse, pen, voice input device, touch input device, etc. connected via one or more input interfaces. Output device(s) 970, such as a display, speakers, printer, etc. may also be included and connected via one or more output interfaces. For example, the output devices 970 may include the display device 150 of FIG. 1. The computing device 910 also contains one or more communication connections 980 that allow the computing device 910 to communicate with other computing devices 990 over a wired or a wireless network. For example, the computing device 910 may communicate with a document corpus 992. In an illustrative embodiment, the document corpus 992 is the document corpus 120 of FIG. 1 or the document corpus 200 of FIG. 2. The computing device 910 may also communicate with one or more relational databases or portions of relational databases, including database elements included in the document corpus 992.

It will be appreciated that not all of the components or devices illustrated in FIG. 9 or otherwise described in the previous paragraphs are necessary to support embodiments as herein described. For example, the removable storage 940 may be optional.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Those of skill would further appreciate that the various illustrative logical blocks, configurations, modules, and process steps or instructions described in connection with the embodiments disclosed herein may be implemented as electronic hardware or computer software. Various illustrative components, blocks, configurations, modules, or steps have been described generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method described in connection with the embodiments disclosed herein may be embodied directly in hardware, in a software module executed by a processor, or in a combination of the two. A software module may reside in computer readable media, such as random access memory (RAM), flash memory, read only memory (ROM), registers, a hard disk, a removable disk, a CD-ROM, or any other form of storage medium known in the art. An exemplary storage medium is coupled to a processor such that the processor can read information from, and write information to, the storage medium. In the alternative, the storage medium may be integral to the processor or the processor and the storage medium may reside as discrete components in a computing device or computer system.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The previous description of the embodiments is provided to enable a person skilled in the art to make or use the embodiments. Various modifications to these embodiments will be readily apparent to those skilled in the art, and the generic principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A computer-readable storage device comprising instructions that, when executed by a computer, cause the computer to:
   receive a concept hierarchy, wherein the concept hierarchy identifies concepts associated with a document corpus, wherein newly created documents are without user intervention added to the document corpus and deleted documents are without user intervention removed from the document corpus based on information from one or more monitoring agents;
   generate an interface based on the concept hierarchy, wherein the interface is operable to navigate, search, and modify the concept hierarchy;
   transmit the interface for display to a display device;
   receive a search query; and
   in response to the search query:
      search the document corpus using the search query; and
      search the concept hierarchy for one or more concepts that are semantically related to the search query.

2. The computer-readable storage device of claim 1, wherein the interface is further operable to:
   receive a selection of a particular concept of the concept hierarchy;
   display portions of one or more documents of the document corpus that are associated with the particular concept; and
   identify one or more other concepts that are semantically related to the particular concept, wherein document search results from searching the document corpus are selectable to view documents of the document corpus that are associated with the document search results and wherein conceptual search results from searching the concept hierarchy are selectable to navigate the concept hierarchy and to view documents of the document corpus that are associated with the conceptual search results.

3. The computer-readable storage device of claim 1, wherein the concept hierarchy is a self-organizing concept hierarchy, and wherein the concept hierarchy is configured to determine whether to reorganize itself each time a new document is added to the document corpus.

4. The computer-readable storage device of claim 1, wherein the concept hierarchy is a self-organizing concept hierarchy that automatically updates itself in response to modification of a document of the document corpus.

5. The computer-readable storage device of claim 1, wherein the concept hierarchy enables discovery of semantic relationships related to the search query, and wherein a lexical relationship in the documents is used to identify particular documents or portions of documents that are lexically related to the search query.

6. The computer-readable storage device of claim 1, wherein reorganizing the concept hierarchy includes one or more of establishing new links, removing existing links, and updating weights for existing links.

7. The computer-readable storage device of claim 1, wherein adding a document to the document corpus results in removing a concept from the concept hierarchy.

8. A system, comprising:
   a processor;
   a concept hierarchy module executable by the processor to:
      determine a concept hierarchy corresponding to a document corpus; and
      automatically update the concept hierarchy responsive to detecting that a new document is added to the document corpus, wherein the new document is without user intervention added to the document corpus and a deleted documents is without user intervention removed from the document corpus by an monitoring agent; and
   an interface module executable by the processor to:
   generate an interface based on the concept hierarchy;
   transmit the interface for display to a display device;
   receive user input at the interface;
   update the interface to reflect results of performing a navigation operation on the concept hierarchy based on the user input;
   update the interface to reflect results of performing a search operation on the concept hierarchy based on the user input; and
   update the interface to reflect results of performing a modification operation on the concept hierarchy based on the user input.

9. The system of claim 8, wherein the interface indicates at least one weight that represents a degree of relation between concepts of the concept hierarchy and wherein the interface module is further executable by the processor to automatically update the at least one weight based on a change at the document corpus.

10. The system of claim 8, wherein the interface is integrated into a file manager application that is operable to:
   receive a selection of a particular concept;
   receive a selection of a particular directory;
   identify one or more documents in the particular directory that are semantically related to the particular concept; and
   identify one or more documents that are lexically related to the user input, wherein a lexical relationship identifies particular documents or portions of documents.

11. The system of claim 8, wherein adding a document to the document corpus results in removing of a concept from the concept hierarchy.

12. The system of claim 8, wherein the interface includes a concept browser, a folder viewer, and a file viewer.

13. A method comprising:
   receiving a concept hierarchy at a computing device, wherein the concept hierarchy identifies concepts associated with a document corpus, wherein newly created documents are without user intervention added to the document corpus and deleted documents are without user intervention removed from the document corpus based on information from one or more monitoring agents;
   generating an interface using the concept hierarchy, wherein the interface is operable to navigate and search the concept hierarchy;
   receiving a search query via the interface;
   in response to receiving the search query, identifying document search results by searching the document corpus based on the search query and identifying conceptual search results by searching the concept hierarchy for one or more concepts that are semantically related to the search query;
   concurrently displaying the document search results and the conceptual search results at the interface, wherein the document search results are selectable via the interface to view one or more documents of the document corpus that are associated with the document search results, and
   wherein the conceptual search results are selectable via the interface to navigate the concept hierarchy and to view one or more documents of the document corpus that are associated with the conceptual search results.

14. The method of claim 13, further comprising automatically determining whether to reorganize the concept hierarchy in response to detecting addition of a new document to the document corpus.

15. The method of claim 13, wherein the interface represents the concept hierarchy as a graph comprising a plurality of nodes connected by a plurality of links, wherein a particular node of the plurality of nodes corresponds to a particular concept and wherein a particular link between a pair of nodes represents a semantic relationship between concepts corresponding to the pair of nodes.

16. The method of claim 15, wherein the interface concurrently displays particular documents or portions of documents that are lexically related to the search query.

17. The method of claim 15, wherein a concept is removed from the concept hierarchy in response to adding a document to the document corpus.

18. The method of claim 15, wherein a size of a node is partially based on a number of hierarchical levels below the concept corresponding to the node, and wherein more hierarchical levels below the concept corresponding to the node are displayed as larger nodes than nodes that have fewer hierarchical levels below the concept corresponding to the node.

19. The method of claim 15, wherein the particular link between the pair of nodes is associated with a weight that indicates a degree of relation between the concepts corresponding to the pair of nodes, and wherein the weight is dynamically updated as documents are added, removed, or updated at the document corpus.

* * * * *